United States Patent [19]

Daudel et al.

[11] Patent Number: 5,369,956
[45] Date of Patent: Dec. 6, 1994

[54] EXHAUST GAS AFTERTREATMENT DEVICE FOR INTERNAL COMBUSTION ENGINES

[75] Inventors: Helmut Daudel, Schorndorf; Klaus-Jürgen Marquardt, Remshalden; Uwe Gärtner, Weinstadt, all of Germany

[73] Assignee: Mercedes-Benz AG, Germany

[21] Appl. No.: 53,009

[22] Filed: Apr. 27, 1993

[30] Foreign Application Priority Data

May 27, 1992 [DE] Germany .............................. 4217552

[51] Int. Cl.$^5$ ................................................ F01N 3/20
[52] U.S. Cl. ......................................... 60/276; 60/286
[58] Field of Search .................... 60/274, 276, 277, 286

[56] References Cited

U.S. PATENT DOCUMENTS 5,201,802 4/1993 Hirota ..................... 60/276
5,233,934 8/1993 Krigmont ................. 60/276

FOREIGN PATENT DOCUMENTS 0515857 12/1992 European Pat. Off. .
3337793 5/1985 Germany .
3704030 8/1988 Germany .
3744388 7/1989 Germany .
3825206 2/1990 Germany .
3830045 3/1990 Germany .

Primary Examiner—Douglas Hart
Attorney, Agent, or Firm—Evens, McKeown, Edwards & Lenahan

[57] ABSTRACT

An exhaust gas aftertreatment device for internal combustion engines having a catalyzer for the selective catalytic reduction of oxides of nitrogen from exhaust gases of motor vehicle diesel engines, provides overstoichiometric supply of $NH_3$ or materials releasing $NH_3$. A first sensor records the $NH_3$ concentration contained in the exhaust gas and interrupts the supply of the $NH_3$ quantity when a specified upper threshold value is reached. A second sensor records the $NH_3$ adsorbed in the catalyzer, by way of which the $NH_3$ supply is resumed on reaching a specified lower threshold value. Alternatively, only one $NH_3$ sensor is provided in the exhaust gas aftertreatment device. The $NH_3$ concentration determined by this single sensor is compared, as the actual value, with a required value corresponding to a specified $NH_3$ concentration in order to form a correction signal which is used for triggering the metering appliance continuously connected into the gas phase.

4 Claims, 1 Drawing Sheet

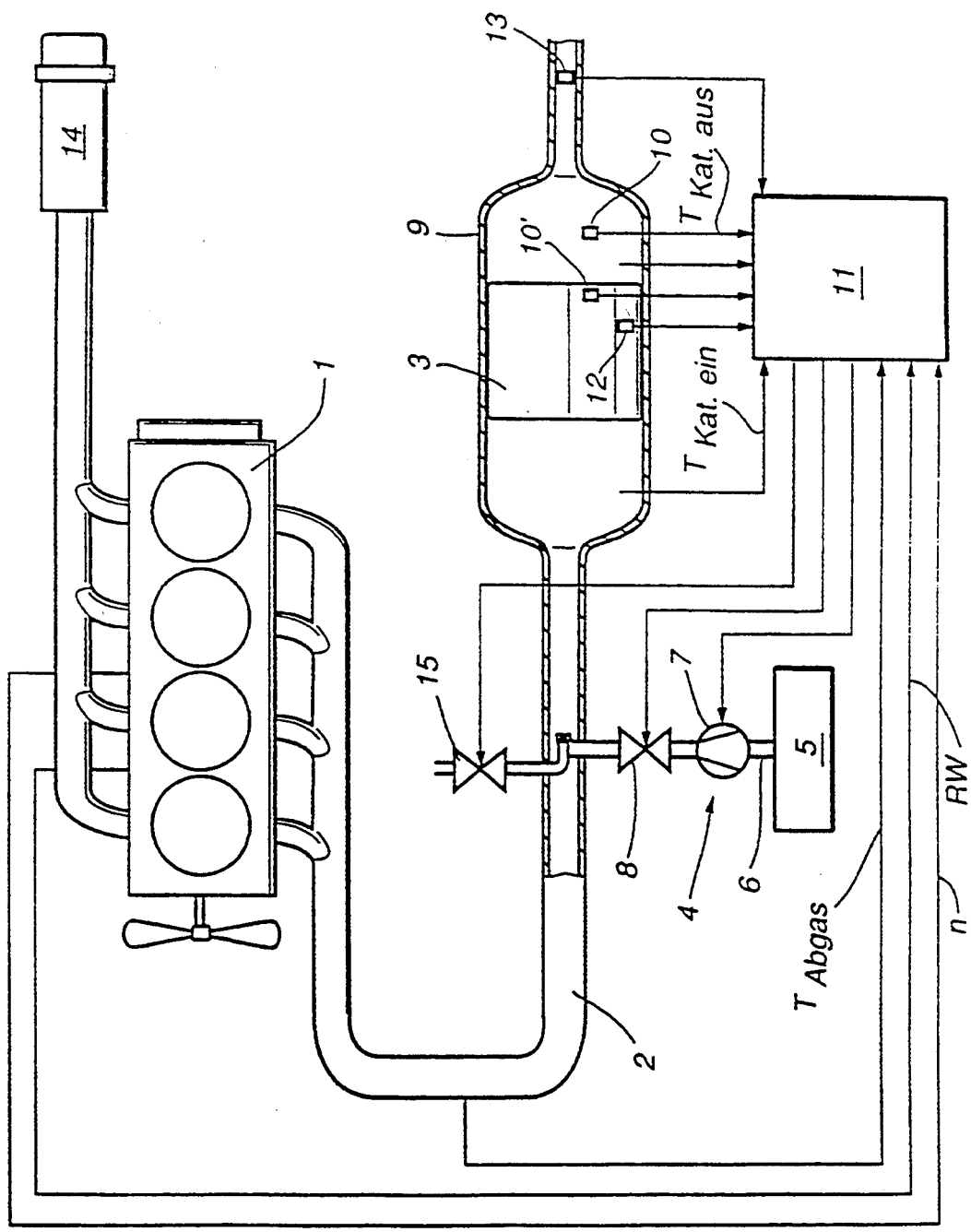

ated addition of the reducing agent $NH_3$ and, specifically, by measuring the $NO_x$ concentration before and after the catalyzer, because the charge condition of the catalyzer is not defined in this mode of operation.

EXHAUST GAS AFTERTREATMENT DEVICE FOR INTERNAL COMBUSTION ENGINES

BACKGROUND AND SUMMARY OF THE INVENTION

The present invention relates to an exhaust gas aftertreatment device for internal combustion engines having a catalyzer for selective catalytic reduction of oxides of nitrogen from exhaust gases, especially from exhaust gases of motor vehicle diesel engines. More particularly, the present invention relates to a device comprising a metering appliance for an overstoichiometric supply of one of $NH_3$ and materials releasing $NH_3$, at least two sensors, one of which is an $NH_3$ sensor configured to interrupt the supply when a quantity of $NH_3$ quantity exceeds a specified upper threshold value, and to resume the supply when, in the catalyzer, a stored $NH_3$ quantity reaches a specified lower threshold value, and also to a device comprising a metering appliance for supply of one of $NH_3$ and of materials releasing $NH_3$, and a single sensor for determining the $NH_3$ concentration in the exhaust gas.

As is well known, the oxides of nitrogen contained in the exhaust gases are reduced to nitrogen and water on a catalyzer when a reducing agent, namely ammonia ($NH_3$) or compounds forming ammonia, is added.

Measures are disclosed in DE 3,825,206 to provide a pulsed overstoichiometric metered addition of the reducing agent $NH_3$ and, specifically, by measuring the $NO_x$ concentration before and after the catalyzer, because the charge condition of the catalyzer is not defined in this mode of operation.

Furthermore, measures for the selective catalytic reduction of oxides of nitrogen from exhaust gases are described in German Patent Application P 41 17 143.8-43, by way of which the high $NH_3$ concentration occurring in the metering phase is recorded by a sensor placed in the catalyzer. The sensor interrupts the $NH_3$ supply after detection of the specified $NH_3$ concentration. As soon as the $NH_3$ stored in the catalyzer is substantially used up by the reaction, the renewed employment of the $NH_3$ supply is determined by approximate calculation, from the engine characteristic diagram and the operating period, of the $NO_x$ produced by the engine over the period since the beginning of metering or the end of metering, taking account of the average degree of separation.

An object of the present invention is to provide simple measures In an exhaust gas aftertreatment device provided for non-stationary internal combustion engines to further improve the reduction of the oxides of nitrogen contained in the exhaust gas.

The foregoing object has been achieved in accordance with the present invention by providing a further sensor as an $NH_3$ sensor recognizing the lower threshold value of the stored $NH_3$ quantity, or by supplying $NH_3$ in the gas phase without metering pauses so that the $NH_3$ concentration recorded by the sensor is compared, as the actual value, with a required value corresponding to a specified $NH_3$ concentration to form a correction signal usable for triggering the metering appliance continuously connected into the gas phase.

Due to the advantageous measures according to the present invention, it is not necessary to calculate the charge level in the catalyzer during the metering pause or $NH_3$ interruption phase on the basis of the characteristic diagram. The matching of the $NH_3$ supply to the various engine types with very different exhaust gas emissions becomes superfluous and it is not necessary to take account of the unavoidable component scatter within a type in the selection of the level limits. A second ammonia ($NH_3$) sensor, which detects the ammonia adsorbed in the catalyzer, undertakes the recognition of the lower charge level whereas the first ammonia sensor detects gaseous ammonia.

This first $NH_3$ sensor can be placed either downstream of the catalyzer or in the catalyzer itself. Although the arrangement of the sensor within the catalyzer does not permit an optimum utilization of the catalyzer volume, it does ensure that the $NO_x$ emissions do not exceed the permissible limiting values. The arrangement of the sensor after the catalyzer permits, however, full utilization of the catalyzer volume for the maximum adsorption capacity, but a brief minimum unallowable $NH_3$ break-out cannot always be excluded.

Although a special embodiment with a second sensor is generally described in the aforementioned German Patent application P 41 17 143.8-43, this special configuration is subjected to exhaust gas upstream of the catalyzer in contrast to the present invention.

Continuous control of a slight, but constant $NH_3$ slip within permissible limiting values is possible by measures in which the $NH_3$ is supplied in the gas phase without metering pauses so that the $NH_3$ concentration recorded by the sensor is compared, as the actual value, with a required value corresponding to a specified $NH_3$ concentration to form a correction signal usable for triggering the metering appliance continuously connected into the gas phase. The advantage of this arrangement lies in avoiding the need for any type of characteristic diagram and in the compensation for any changes to the engine and the catalyzer within the control range.

BRIEF DESCRIPTION OF THE DRAWING

These and other objects, features and advantages of the present invention will become more readily apparent from the following detailed description thereof when taken in conjunction with the accompanying sole figure which is a schematic diagram of an internal combustion engine and catalyzer utilizing the present invention.

DETAILED DESCRIPTION OF THE DRAWING

An internal combustion engine is designated generally by numeral 1, an exhaust gas conduit by numeral 2, a catalyzer by numeral 3 and a metering appliance by numeral 4. The metering appliance 4 comprises a reducing agent tank 5 and a supply conduit 6 with a delivery pump 7 and a shut-off valve 8. The supply conduit 6 opens into the exhaust gas conduit 2 upstream of the catalyzer 3. The system also includes an air filter 14 and a compressed air valve 15. The reducing agent tank 5 contains ammonia ($NH_3$) or materials releasing ammonia, which are supplied in a controlled manner to the exhaust gas flow in the exhaust gas conduit 2.

The catalyzer 3 is arranged in a casing 9 in which a first $NH_3$ sensor 10 is provided in one embodiment downstream of the catalyzer 3. This $NH_3$ sensor 10 measures the $NH_3$ concentration in the exhaust gas and feeds a switching signal into a control unit 11 at a time when the gaseous $NH_3$ quantity has reached a fixed upper threshold value. The control unit 11 controls the delivery pump 7 in the sense of switching it off so that the NH3 supply is interrupted.

A second NH3 sensor 12 is arranged in, for example, carrier material of the catalyzer 3 to detect adsorbed NH3. As soon as the lower level limit is reached in the catalyzer 3 and the NH3 stored in the catalyzer has been substantially consumed by reaction, a switch signal corresponding to the fixed lower NH3 threshold value is supplied to the control unit 11. The control unit 11 controls the delivery pump 7 in the sense of switching it on again and metered addition of NH3 is resumed and, in fact, as a function of operating parameters such as engine rotational speed n, control distance CD, exhaust gas temperature $T_{exhaust}$ upstream of the NH3 supply and exhaust gas temperatures at inlet, $T_{cat.in}$ and outlet, $T_{cat.out}$ of the catalyzer 3. During the metering pause, the shut-off valve 8 triggered by the control unit 11 shuts off the supply conduit 6, into which no exhaust gas can flow.

The first NH3 sensor 10 can, however, also be placed in the catalyzer 3 as indicated by the numeral 10' to measure, in contrast to the second NH3 sensor 12 which measures lower charge level, gaseous NH3.

A further embodiment of the present invention provides for continuous control of the metering appliance 4 by the arrangement of a single NH3 sensor 13 downstream of the catalyzer 3. It is also possible to place this NH3 sensor 13 in the catalyzer 3 itself. The sensor 13 determines the respective NH3 concentration in the gas phase. The instantaneously present NH3 concentration is compared, as the actual value, with a required value corresponding to a specified NH3 concentration and a correction signal formed from this is used for triggering the metering appliance 4. The continuous control provides an ammonia slip, within the permissible limiting values, which is as small as possible and constant.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An exhaust gas aftertreatment device for an internal combustion engine having a catalyzer for selective catalytic reduction of oxides of nitrogen from exhaust gas, comprising a metering appliance for an overstoichiometric supply of one of NH3 and materials releasing NH3, and at least one NH3 sensor configured to interrupt the supply when an NH3 quantity exceeds a specified upper threshold value, and an NH3 sensor configured to recognize a specific lower threshold value of a stored NH3 quantity and to resume the supply when, in the catalyzer, the stored NH3 quantity reaches the specified lower threshold value.

2. The device according to claim 1, where the exhaust gas is an diesel engine exhaust gas.

3. The device according to claim 1, wherein the first NH3 sensor and the another NH3 sensor are operatively arranged in the catalyzer such that the first NH3 sensor measures the NH3 concentration in the exhaust gas and the another NH3 sensor measures the NH3 adsorbed in the catalyzer.

4. The device according to claim 1, wherein the another NH3 sensor is operatively arranged in the catalyzer and the first NH3 sensor is operatively arranged downstream of the catalyzer such that the first NH3 sensor measures the NH3 concentration in the exhaust gas and the another NH3 sensor measures the NH3 adsorbed in the catalyzer.

* * * * *